US008203800B2

(12) United States Patent
Li et al.

(10) Patent No.: US 8,203,800 B2
(45) Date of Patent: Jun. 19, 2012

(54) SERVO DESIGN IN DATA STORAGE MEDIA (75) Inventors: Shaoping Li, San Ramon, CA (US); Jinshan Li, San Jose, CA (US); Feng Liu, San Ramon, CA (US); Kuok San Ho, Redwood City, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 12/398,837

(22) Filed: Mar. 5, 2009

(65) Prior Publication Data
US 2010/0226038 A1    Sep. 9, 2010

(51) Int. Cl.
*G11B 5/09* (2006.01)
*G11B 5/596* (2006.01)

(52) U.S. Cl. ....... 360/48; 360/51; 360/77.08; 360/77.02

(58) Field of Classification Search .................. None
See application file for complete search history.

(56) References Cited

U.S. PATENT DOCUMENTS

| | | | |
|---|---|---|---|
| 4,402,021 A | 8/1983 | Sonoda et al. | |
| 4,575,775 A * | 3/1986 | Albrecht | 360/77.08 |
| 5,844,509 A | 12/1998 | Behrens et al. | |
| 5,875,158 A | 2/1999 | Schell | |
| 5,995,305 A | 11/1999 | McNeil et al. | |
| 6,581,184 B1 | 6/2003 | Saeki et al. | |
| 6,757,126 B1 | 6/2004 | Kuroda et al. | |
| 6,760,186 B1 * | 7/2004 | Codilian et al. | 360/77.11 |
| 6,785,074 B2 | 8/2004 | Tsuchinaga | |
| 7,328,138 B1 | 2/2008 | Trabert et al. | |
| 7,365,933 B2 | 4/2008 | Hamaguchi et al. | |
| 2006/0028772 A1 * | 2/2006 | Raastad | 360/315 |
| 2010/0073810 A1 * | 3/2010 | Ozturk et al. | 360/77.08 |

OTHER PUBLICATIONS

Gao et al., "Transition Jitter Estimates in Tilted and Conventional Perpendicular Recording Media at 1 Tb/in2", IEEE Transactions on Magnetics, vol. 39, No. 2, Mar. 2003, pp. 704-709.

Moser et al., "Magnetic recording: advancing into the future", J. Phys. D: Appl. Phys. 35 (2002), pp. R157-R167.

* cited by examiner

*Primary Examiner* — Andrew L Sniezek

(57) ABSTRACT

A data storage medium comprises a plurality of data regions, and a plurality of servo regions configured to provide positioning information to a reading device. Each of the plurality of data regions corresponds to more than one of the plurality of servo regions. The more than one of the plurality of servo regions are configured to provide positioning information to the reading device at discrete times corresponding to a data operation of a corresponding data region.

21 Claims, 6 Drawing Sheets

Fig. 1

Prior Art

SERVO DESIGN IN DATA STORAGE MEDIA

FIELD OF THE INVENTION

The present invention generally relates to data storage media and, in particular, relates to improved servo designs in data storage media.

BACKGROUND OF THE INVENTION

Figure 1:
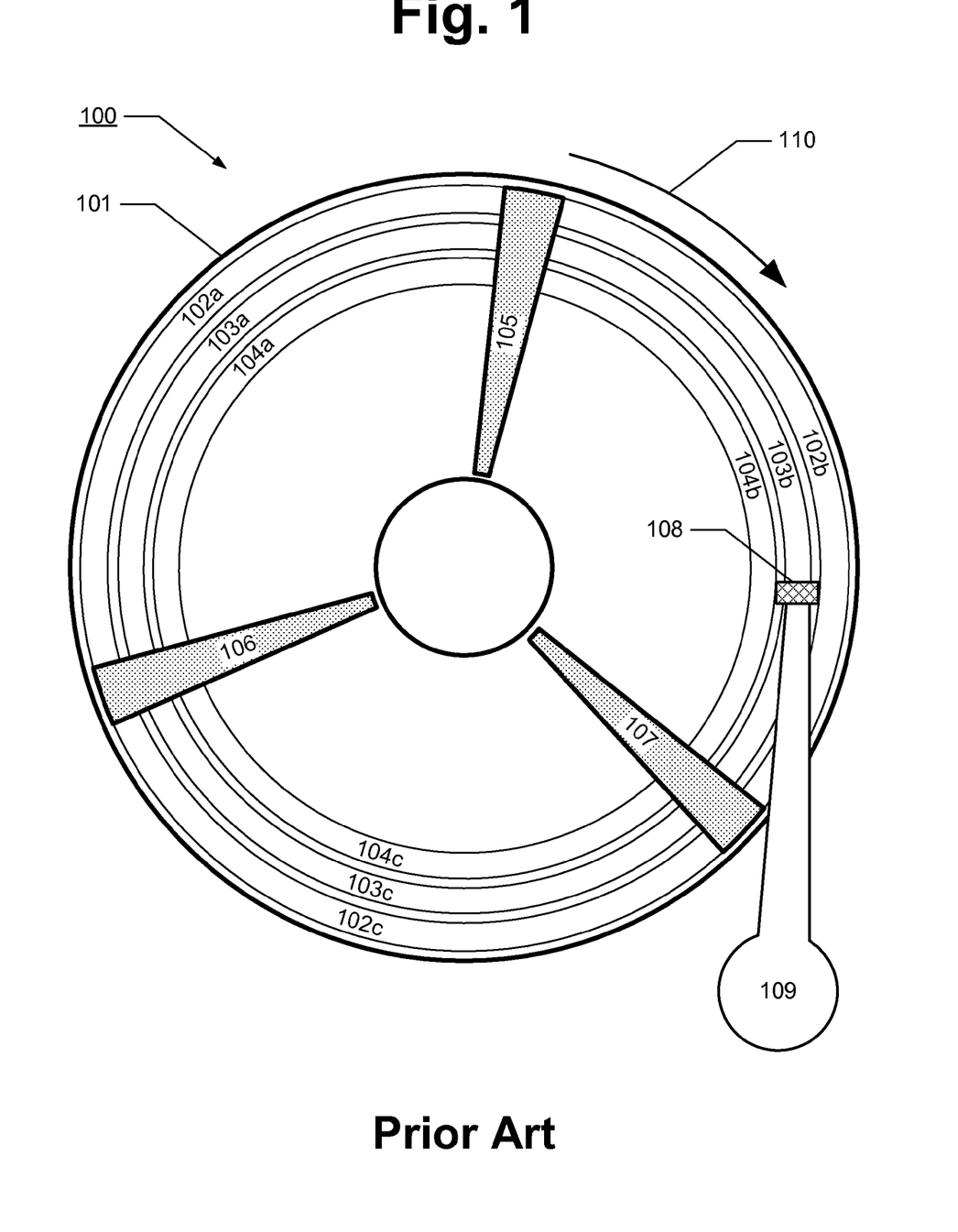
FIG. 1 is a simplified diagram illustrating a data storage system of the prior art.

FIG. 1 illustrates a conventional data storage system, including a hard disk platter 101, in which circumferential tracks include multiple data regions, such as data regions 102a-102c, 103a-103c and 104a-104c, separated by wedge-shaped servo zones, such as servo zones 105, 106 and 107. A reading device, such as magnetic transducer 108, may be suspended over platter 101 on a swing arm 109 while platter 101 rotates (in direction 110), such that the transducer passes over a servo zone (e.g., servo zone 105) before passing over a data region (e.g., data region 103a). In passing over servo zone 105, transducer 108 detects positioning information encoded thereon, and is thereby able to accurately determine its position with respect to data region 103a.

Accurate positioning information becomes increasingly important as the size of the magnetic domains (or other structures representing data bits) is decreased in order to provide increased data capacities. For example, in data storage media with very high areal density, timing jitter sources present a serious obstacle to the synchronization between a write head and the physical location of a particular magnetic domain. In this regard, by the time the transducer has passed part of the way along the track length of a data region, the synchronization may be lost. This could be offset by decreasing the track length of data regions, and increasing the number of servo regions, but such an approach would reduce the amount of data that could be stored on the medium.

SUMMARY OF THE INVENTION

Various embodiments of the present invention solve the foregoing problem by providing servo designs that allow for improved synchronization in a data storage medium without little or no increase in the area of the medium devoted to servo regions. During (and/or before) a data operation in a given data region, a reading device can make several timing synchronizations with multiple servo regions spaced along the length of the data region.

According to one aspect of the subject disclosure, a data storage medium comprises a plurality of data regions, and a plurality of servo regions configured to provide positioning information to a reading device. Each of the plurality of data regions corresponds to more than one of the plurality of servo regions. The more than one of the plurality of servo regions are configured to provide positioning information to the reading device at discrete times corresponding to a data operation of a corresponding data region.

According to another aspect of the subject disclosure, a data storage system comprises a data storage medium having a plurality of data regions and a plurality of servo regions. The data storage system further comprises a reading device configured to receive first positioning information from one of the plurality of servo regions before a data operation of one of the plurality of data regions and to receive second positioning information from another one of the plurality of servo regions during a data operation of the one of the plurality of data regions.

According to another aspect of the subject disclosure, a data storage system comprises a reading device and a data storage medium. The data storage medium comprises a plurality of data regions and a plurality of servo regions configured to provide positioning information to the reading device. Each of the plurality of data regions corresponds to more than one of the plurality of servo regions. The more than one of the plurality of servo regions are configured to provide positioning information to the reading device at discrete times corresponding to a data operation of a corresponding data region.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 2:
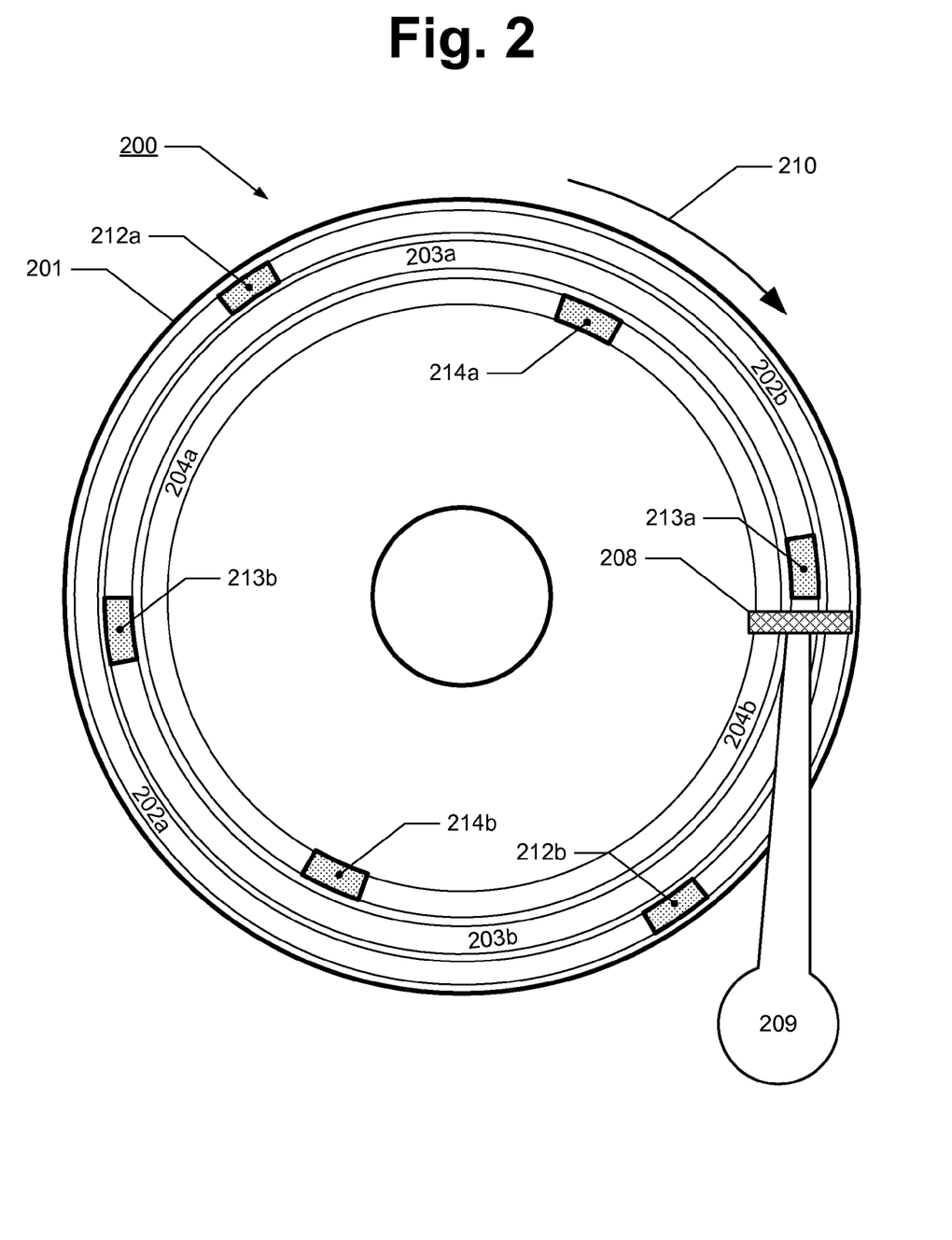
FIG. 2 is a simplified diagram illustrating a data storage system in accordance with one aspect of the subject disclosure.

FIG. 2 is a simplified, not-to-scale diagram illustrating a data storage system in accordance with one aspect of the subject disclosure. Data storage system 200 includes a data storage medium 201, such as a hard drive platter, which includes a plurality of data regions (202a, 202b, 203a, 203b, 204a and 204b) and servo regions (212a, 212b, 213a, 213b, 214a and 214b). In accordance with various aspects of the subject disclosure, a hard drive platter may be configured as a continuous media, a discrete track media, or as a bit-patterned media. Data storage system 200 further includes a reading device 208 suspended above data storage medium 201 by a swing arm 209.

In exemplary data storage medium 201, each data region corresponds to more than one servo region, and each servo region corresponds to more than one data region. In particular, each data region is associated with more than one servo region that provides positioning information to a reading device 208 during (and/or before) a data operation of that data region. Additionally, each servo region is configured to provide positioning information to reading device 208 during (and/or before) data operations in several nearby data regions. For example, data storage region 203a corresponds to both servo region 213a (which may provide positioning information to a reading device 208 before a data operation begins on data region 203a), servo region 214a (which may provide positioning information to reading device 208 about ⅓ of the way through the data operation on data region 203a), and servo region 212a (which may provide positioning information to reading device about ⅔ of the way through the data operation on data region 203a).

As can be seen with reference to FIG. 2, this configuration is accomplished by circumferentially spacing the servo regions apart from one another, such that during the read or write of a data region, several servo regions can provide positioning information to reading device 208, whereby synchronization of reading device 208 with the data region can be maintained.

Figure 3:
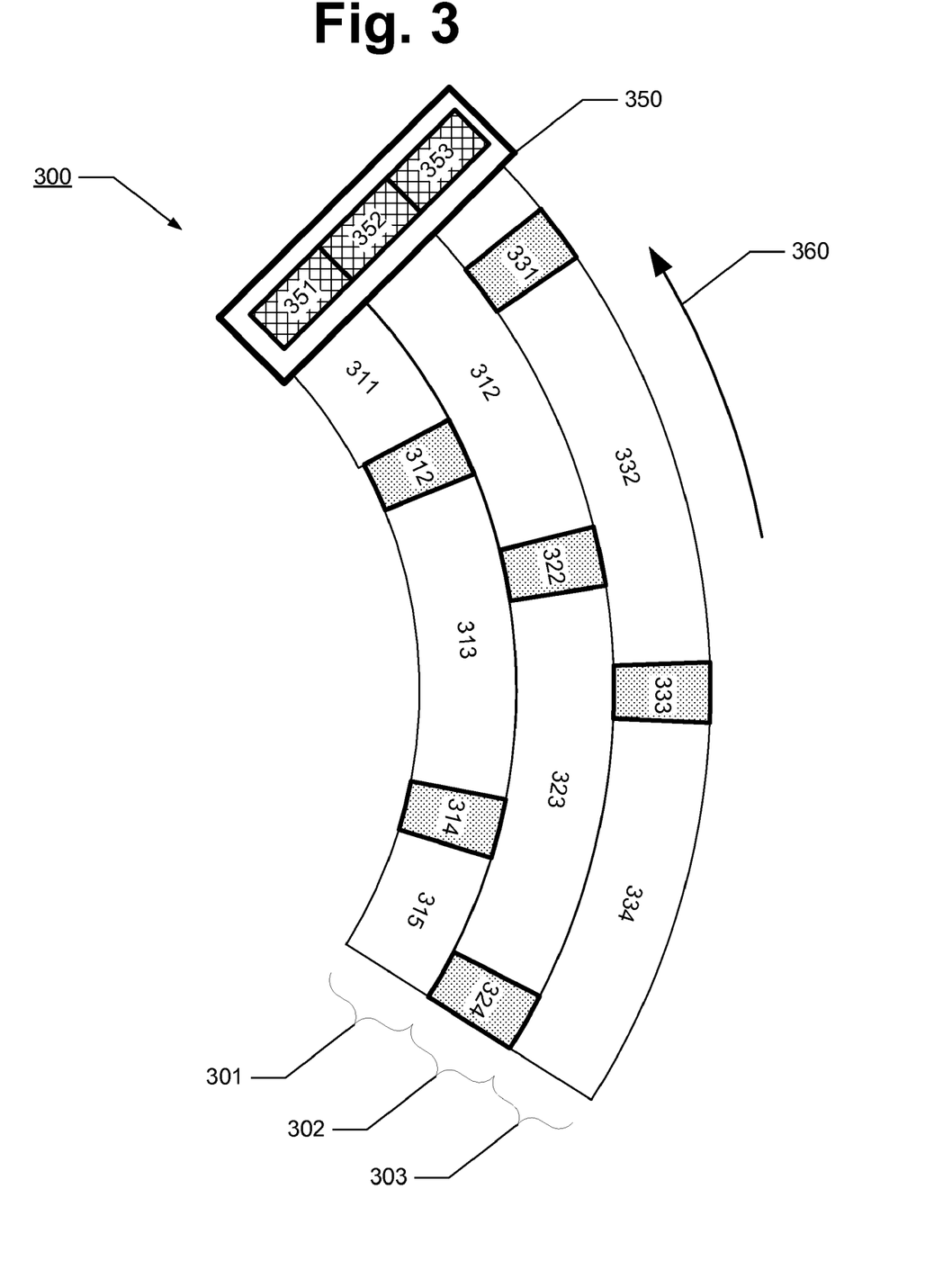
FIG. 3 is a partial view of a data storage system in accordance with one aspect of the subject disclosure.

This may be more easily understood with reference to FIG. 3, which illustrates a partial view of a data storage system in accordance with one aspect of the subject disclosure. Data storage system 300 includes a data storage medium that includes a plurality of data storage regions, such as those disposed in circumferential tracks 301, 302 and 303. The data storage medium further includes a plurality of servo regions configured to provide positioning information to reading device 350. Reading device 350 includes a plurality of circumferentially spaced magnetoresistive transducers 351, 352 and 353. Each of the data regions corresponds to more than one of the servo regions, such that in a data operation (e.g., a read or a write) of one of the data regions, the more than one corresponding servo regions provide positioning information to transducers 351, 352 and 353 of reading device 350 at discrete times corresponding to the data operation (e.g., before and during).

For example, in a read operation of data region 323 (where the data storage medium is rotating under reading device 350 in direction 360), the reading device 350 obtains positioning information at several discrete times corresponding to the read operation. As servo region 322 passes under transducer 352 of reading device 350, transducer 352 obtains positioning information at the beginning of the read operation. As servo region 333 passes under transducer 353 of reading device 350, transducer 353 obtains positioning information about ⅓ of the way through the read operation. As servo region 314 passes under transducer 351 of reading device 350, transducer 351 obtains positioning information about ⅔ of the way through the read operation. In this manner, synchronization of reading device 350 with data region 323 can be maintained throughout the read operation.

While in the foregoing exemplary embodiments, the present invention has been described with reference to a rotating disk having circumferentially spaced data regions and servo regions (e.g., magnetic and optical disks), the scope of the present invention is not limited to such an arrangement. Rather, as will be apparent to one of skill in the art, the present invention has application to any data storage media in which parallel or adjacent data regions are disposed, such as magnetic tape media or the like.

Figure 4:
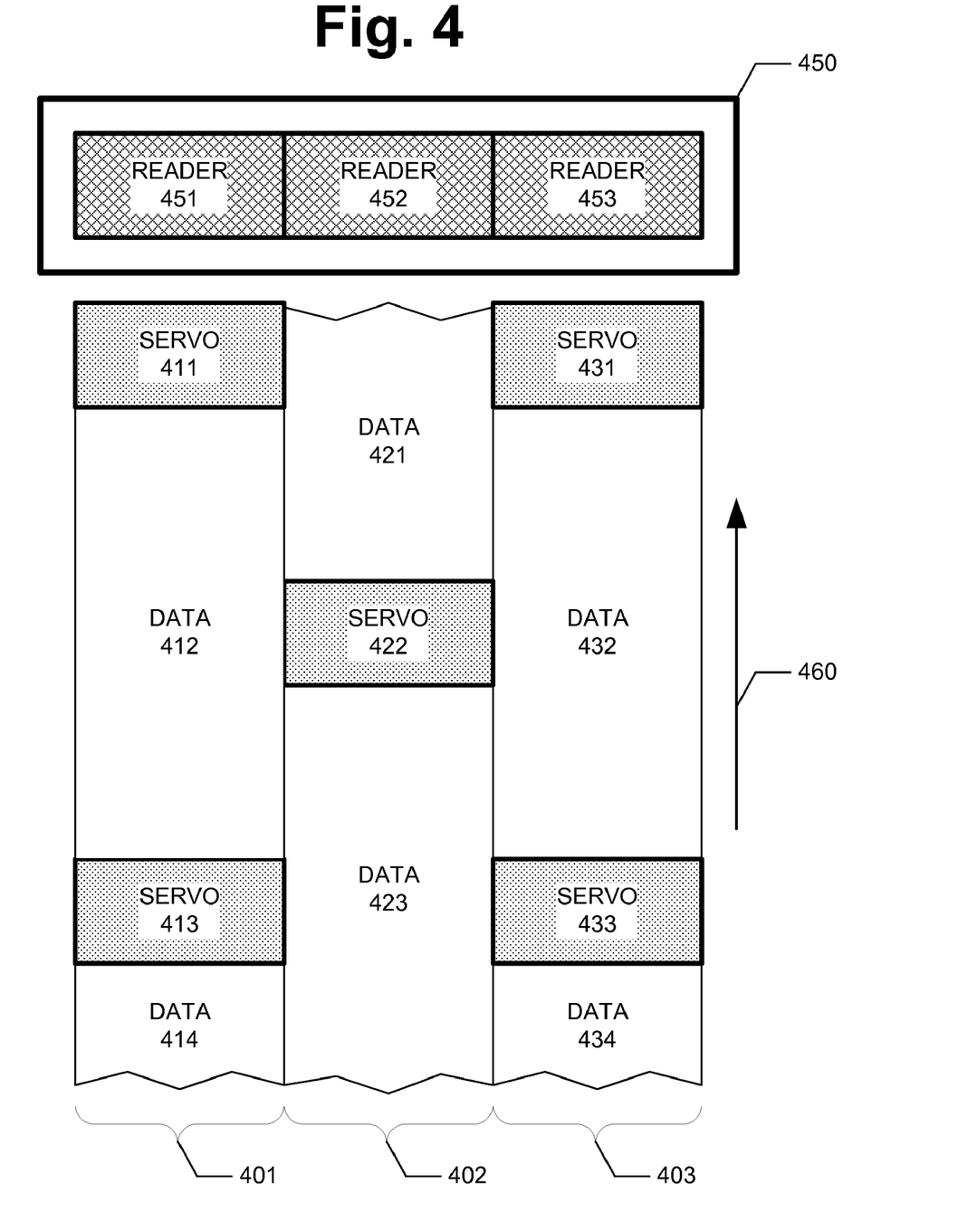
FIG. 4 is a partial view of a data storage system in accordance with one aspect of the subject disclosure.

For example, turning to FIG. 4, a data storage system is partially illustrated in accordance with one exemplary aspect of the subject disclosure. The data storage system of FIG. 4 includes a data storage medium (here represented by the three parallel data tracks 401, 402 and 403), which comprises a plurality of data regions (412, 414, 421, 423, 432 and 434) and a plurality of servo regions (411, 413, 422, 431 and 433). The data storage system further includes a reading device 450 which comprises a number of readers (451, 452 and 453). In accordance with various embodiments of the subject disclosure, readers 451, 452 and 453 may be any one of a number of transducers, including magnetic, photoelectric, magneto-optical, electrical or the like.

As in the data storage media described in greater detail above, each of the data regions in the data storage medium corresponds to more than one of the servo regions, such that in a data operation (e.g., a read or a write) of one of the data regions (as the data storage medium moves in direction 460 relative to reading device 450), the more than one corresponding servo regions provide positioning information to readers 451, 452 and 453 of reading device 450 at discrete times corresponding to the data operation (e.g., before and during). Unlike in the exemplary embodiments illustrated above, in the exemplary data storage system of FIG. 4, reading device 450 is provided with a redundant number of readers. In this regard, even though each data storage region is associated with only two servo regions, reading device 450 includes three readers. For example, in a write operation of data region 423 (where the data storage medium is moving relative to reading device 450 in direction 460), reading device 450 obtains positioning information at two discrete times corresponding to the write operation (which may be carried out by a writing device not illustrated in FIG. 4, but readily understood by those of skill in the art). As servo region 422 passes under reader 452 of reading device 450, reader 452 obtains positioning information at the beginning of the write operation. As servo regions 413 and 433 pass under readers 451 and 453, respectively, these readers obtain positioning information about ½ of the way through the write operation. In the event one of readers 451 or 453 are damaged, this redundant configuration still permits multiple synchronizations with each data operation.

While in the foregoing exemplary embodiments, the data storage systems have been illustrated as including reading devices with readers configured to read servo information from immediately adjacent tracks, the scope of the present invention is not limited to this particular arrangement. Rather, as can be seen with reference to FIG. 5, a data storage medium can be configured with servo regions in non-adjacent data tracks, while still maintaining the benefit of multiple synchronizations in a single data operation.

Figure 5:
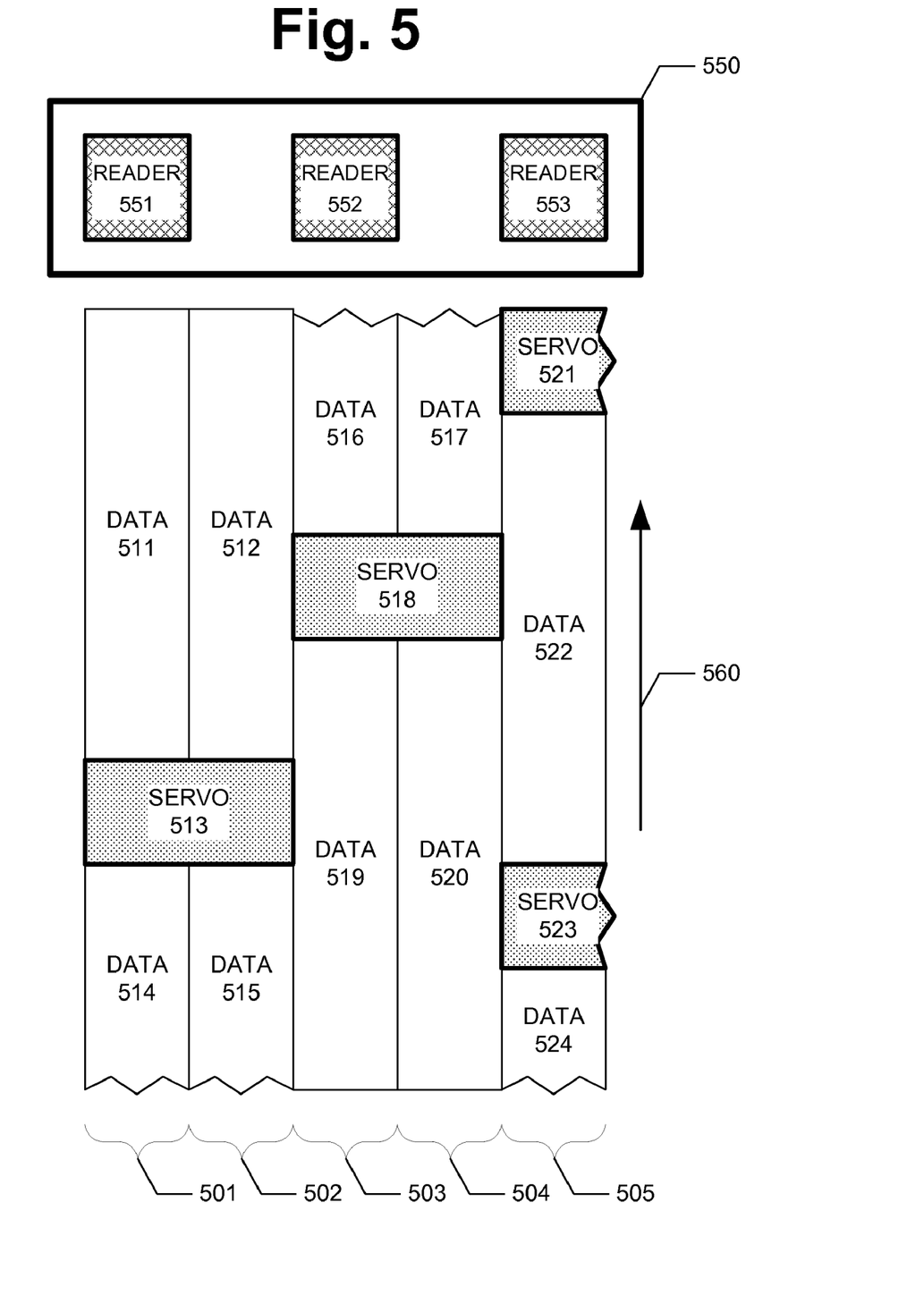
FIG. 5 is a partial view of a data storage system in accordance with one aspect of the subject disclosure.

FIG. 5 illustrates a partial view of a data storage system in accordance with one aspect of the subject disclosure. The data storage system of FIG. 5 includes a data storage medium (here represented by the five parallel data tracks 501-505), which comprises a plurality of data regions (511, 512, 514, 515, 516, 517, 519, 520, 522 and 524) and a plurality of servo regions (513, 518, 521 and 523). The data storage system further includes a reading device 550 which comprises a number of readers (551, 552 and 553). Unlike in the exemplary embodiments illustrated above, in the exemplary data storage system of FIG. 5, the readers of reading device 550 are spaced apart by approximately 1×the track width of tracks 501-505. Moreover, each servo region is 2×the track width of tracks 501-505, and spans across two adjacent tracks. Accordingly, reading device 550 can obtain positioning information from servo regions disposed in tracks which are not adjacent to the data region upon which a data operation is being performed. For example, in a read operation of data region 519 (where the data storage medium is moving relative to reading device 550 in direction 560), reading device 552 obtains positioning information at several discrete times corresponding to the read operation. As servo region 518 passes under reader 552 of reading device 550, reader 552 obtains positioning information at the beginning of the read operation. As servo regions 513 and 523 pass under readers 551 and 553, respectively, these readers obtain positioning information about ⅓ and ⅔ of the way through the read operation, respectively.

While in the foregoing exemplary embodiment, the servo regions have been illustrated as extending across two adjacent data tracks (and the readers of the reading device being spaced apart by a single track width), the scope of the present invention is not limited to such an arrangement. Rather, as will be readily apparent to those of skill in the art, a data storage medium may be provided with servo regions which extend across many more data tracks (e.g., across 10 tracks, 100, 1000, etc.). Indeed, to facilitate the manufacture of such a data storage medium, it may be advantageous to provide servo regions which extend across a larger number of data tracks, rather than providing a larger number of servo regions extending across fewer data tracks. Similarly, while in the foregoing exemplary embodiment, the reading device has been illustrated as including readers spaced apart by a single track width, the scope of the present invention is not limited to such an arrangement. Rather, as will be readily apparent to those of skill in the art, a data storage system may be provided with a reading device in which multiple readers are spaced apart by any multiple of the track width of the data storage medium (concomitant with a media design in which the servo regions extend across a corresponding number of data tracks).

Moreover, while the data tracks and servo regions have been illustrated in the exemplary embodiment of FIG. 5 as rectilinear, the configuration of servo regions in non-adjacent data tracks has application to embodiments with circumferential data tracks, as will be readily apparent to those of skill in the art.

While in the foregoing exemplary embodiments, data storage systems have been illustrated with reading devices having exactly three readers, the scope of the invention is not limited to such an arrangement. Rather, as will be readily apparent to those of skill in the art, the present invention has application to data systems in which reading devices have any number of readers greater than one. According to one aspect of the subject disclosure, increasing the number of readers may provide for more synchronizations during a single data operation (e.g., a reading device with five readers could provide five timing synchronizations corresponding to a single data operation, a reading device with ten readers could provide ten, etc.). According to another aspect, increasing the number of readers may provide for greater redundancy and resiliency in the face of reader failure (as illustrated above with respect to exemplary FIG. 4). In accordance with yet another aspect of the subject disclosure, both redundancy and improved synchronization can be combined with an appropriate increase in the number of readers and in servo track width (e.g., ten readers, servos spanning two tracks each, etc.).

Figure 6:
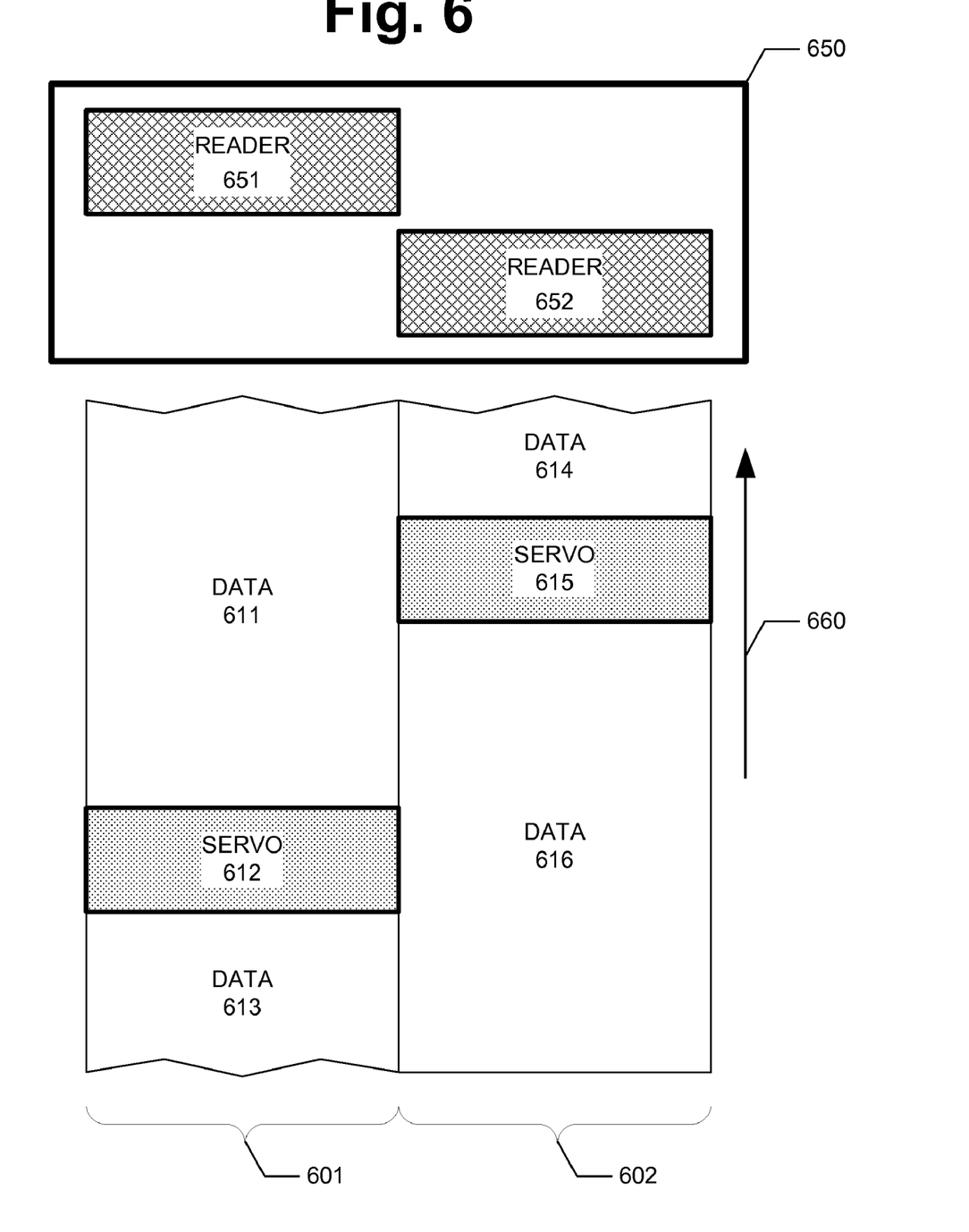
FIG. 6 is a partial view of a data storage system in accordance with one aspect of the subject disclosure.

While in the foregoing exemplary embodiments, the readers of the reading devices have been illustrated and described as being spaced only in a radial or cross-track direction, the scope of the present invention is not limited to such an arrangement. Rather, for ease of fabrication or other design considerations, a reading device may be provided with multiple readers which are spaced in a circumferential or along-track direction. For example, turning to FIG. 6, a data storage system is partially illustrated in accordance with one exemplary aspect of the subject disclosure. The data storage system of FIG. 6 includes a data storage medium (here represented by the two parallel data tracks 601 and 602), which comprises a plurality of data regions (611, 613, 614 and 615) and a plurality of servo regions (612 and 615). The data storage system further includes a reading device 650 which comprises two readers (651 and 652). Unlike in the exemplary embodiments illustrated above, in the exemplary data storage system of FIG. 6, the readers of reading device 650 are spaced both in the cross-track direction and in the along-track direction. This spacing may facilitate the fabrication of reading device 650 (e.g., where readers 651 and 652 are fabricated using semiconductor processing techniques, it may be easier to fabricate these readers in separate layers of material). As in the data storage media described in greater detail above, each of the data regions in the data storage medium corresponds to more than one of the servo regions, such that in a data operation (e.g., a read or a write) of one of the data regions (as the data storage medium moves in direction 660 relative to reading device 650), the more than one corresponding servo regions provide positioning information to readers 651 and 652 of reading device 650 at discrete times corresponding to the data operation (e.g., before and during). For example, in a write operation of data region 616 (where the data storage medium is moving relative to reading device 650 in direction 660), reading device 650 obtains positioning information at two discrete times corresponding to the write operation (which may be carried out by a writing device not illustrated in FIG. 6, but readily understood by those of skill in the art). As servo region 615 passes under reader 652 of reading device 650, reader 652 obtains positioning information at the beginning of the write operation. As servo region 612 passes under reader 651 of reading device 650, reader 651 obtains positioning information about ½ of the way through the write operation of data region 616.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:
1. A data storage medium comprising:
a plurality of circumferential data tracks, each data track being a contiguous data region; and
a plurality of servo regions configured to provide positioning information to a reading device, each of the plurality of servo regions radially extending a distance greater than 100 times a track width of one of the plurality of circumferential data tracks, wherein each of the plurality of data tracks corresponds to more than one of the plurality of servo regions, wherein each of the plurality of servo regions corresponds to more than one of the plurality of data tracks, wherein the more than one of the plurality of servo regions are configured to provide positioning information to the reading device at discrete times corresponding to a data operation of a corresponding data track, wherein the more than one of the plurality of servo regions are configured to provide positioning information to the reading device before and during a data operation of a corresponding data track, and wherein one of the plurality of servo regions is configured to provide positioning information to the reading device before a data operation of a first subset of the plurality of data tracks and during a data operation of a second subset of the plurality of data tracks.

2. The data storage medium of claim 1, wherein the more than one of the plurality of servo regions are circumferentially spaced.

3. The data storage medium of claim 2, wherein, for each of the circumferential data tracks, the more than one of the plurality of servo regions comprise a first servo region located co-radially with the circumferential data track and a second servo region circumferentially spaced from the first servo region and radially distal from the circumferential data track.

4. The data storage medium of claim 3, wherein the first servo region is configured to provide first positioning information to the reading device before a data operation of the corresponding data track, and wherein the second servo region is configured to provide second positioning information during the data operation of the corresponding data track.

5. The data storage medium of claim 1, wherein the data storage medium comprises either a magnetic data medium or an optical data medium.

6. The data storage medium of claim 1, wherein the data storage medium comprises a hard disk platter.

7. The data storage medium of claim 1, wherein the data storage medium comprises one of: a continuous medium, a discrete track medium, and a bit-patterned medium.

8. A data storage system comprising:

a data storage medium having a plurality of circumferential data tracks and a plurality of servo regions, each data track being a contiguous data region, and each of the plurality of servo regions radially extending a distance greater than 100 times a track width of one of the plurality of circumferential data tracks; and a reading device configured to receive first positioning information from one of the plurality of servo regions before a data operation of one of the plurality of data tracks and to receive second positioning information from another one of the plurality of servo regions during the data operation, wherein one of the plurality of servo regions is configured to provide positioning information to the reading device before a data operation of a first subset of the plurality of data tracks and during a data operation of a second subset of the plurality of data tracks.

9. The data storage system of claim 8, wherein each of the plurality of data tracks corresponds to more than one of the plurality of servo regions.

10. The data storage system of claim 8, wherein each of the plurality of servo regions corresponds to more than one of the plurality of data tracks.

11. The data storage system of claim 8, wherein the more than one of the plurality of servo regions are circumferentially spaced.

12. The data storage system of claim 11, wherein, for each of the circumferential data tracks, the more than one of the plurality of servo regions comprise a first servo region located co-radially with the circumferential data track and a second servo region circumferentially spaced from the first servo region and radially distal from the circumferential data track.

13. The data storage system of claim 11, wherein the reading device comprises a plurality of radially spaced magnetoresistive heads.

14. The data storage system of claim 13, wherein the plurality of magnetoresistive heads are also circumferentially spaced.

15. The data storage system of claim 13, wherein the first servo region is configured to provide first positioning information to a first one of the plurality of magnetoresistive heads before a data operation of the corresponding data track, and wherein the second servo region is configured to provide second positioning information to a second one of the plurality of magnetoresistive heads during the data operation of the corresponding data track.

16. The data storage system of claim 13, wherein the plurality of radially spaced magnetoresistive heads are spaced apart by a head spacing distance less than the distance which one of the plurality of servo regions radially extends.

17. The data storage system of claim 8, wherein the data storage medium comprises either a magnetic data medium or an optical data medium.

18. The data storage system of claim 8, wherein the data storage medium comprises a hard disk platter.

19. The data storage system of claim 8, wherein the data storage medium comprises one of: a continuous medium, a discrete track medium, and a bit-patterned medium.

20. A data storage system comprising:

a reading device; and a data storage medium comprising:

a plurality of circumferential data tracks, each data track being a contiguous data region; and a plurality of servo regions configured to provide positioning information to the reading device, each of the plurality of servo regions radially extending a distance greater than 100 times a track width of one of the plurality of circumferential data tracks, wherein each of the plurality of data tracks corresponds to more than one of the plurality of servo regions, wherein each of the plurality of servo regions corresponds to more than one of the plurality of data tracks, wherein the more than one of the plurality of servo regions are configured to provide positioning information to the reading device at discrete times corresponding to a data operation of a corresponding data track, wherein the more than one of the plurality of servo regions are configured to provide positioning information to the reading device before and during a data operation of a corresponding data track, and wherein one of the plurality of servo regions is configured to provide positioning information to the reading device before a data operation of a first subset of the plurality of data tracks and during a data operation of a second subset of the plurality of data tracks.

21. A data storage medium comprising:

a plurality of circumferential data tracks, each data track being a contiguous data region; and a plurality of servo regions configured to provide positioning information to a reading device, each of the plurality of servo regions radially extending a distance greater than 100 times a track width of one of the plurality of circumferential data tracks, wherein each of the plurality of data tracks corresponds to more than one of the plurality of servo regions, wherein the more than one of the plurality of servo regions are circumferentially spaced wherein the more than one of the plurality of servo regions are configured to provide positioning information to the reading device at discrete times corresponding to a data operation of a corresponding data track, wherein the more than one of the plurality of servo regions are configured to provide positioning information to the reading device before and during a data operation of a corresponding data track, and wherein, for each of the circumferential data tracks, the more than one of the plurality of servo regions comprise a first servo region located co-radially with the circumferential data track and a second servo region circumferentially spaced from the first servo region and radially distal from the circumferential data track.

* * * * *